(12) United States Patent
Subbotin et al.

(10) Patent No.: US 7,859,573 B2
(45) Date of Patent: Dec. 28, 2010

(54) METHODS AND APPARATUSES FOR IMAGE EXPOSURE CORRECTION

(75) Inventors: Igor Subbotin, South Pasadena, CA (US); Ilia Ovsiannikov, Studio City, CA (US)

(73) Assignee: Aptina Imaging Corporation, George Town (KY)

( * ) Notice: Subject to any disclaimer, the term of this patent is extended or adjusted under 35 U.S.C. 154(b) by 820 days.

(21) Appl. No.: 11/806,492

(22) Filed: May 31, 2007

(65) Prior Publication Data
US 2008/0298794 A1     Dec. 4, 2008

(51) Int. Cl.
*H04N 5/235* (2006.01)
(52) U.S. Cl. ............... 348/221.1; 348/362; 396/166
(58) Field of Classification Search ............ None
See application file for complete search history.

(56) References Cited

U.S. PATENT DOCUMENTS

| | | | |
|---|---|---|---|
| 5,121,155 | A | 6/1992 | O'Such et al. |
| 6,185,374 | B1 | 2/2001 | Yamaguchi et al. |
| 6,272,292 | B1 | 8/2001 | Iwasaki et al. |
| 2001/0019364 | A1 | 9/2001 | Kawahara |
| 2002/0197071 | A1 | 12/2002 | Hofer |
| 2003/0063907 | A1 | 4/2003 | Muramatsu |
| 2006/0039690 | A1 | 2/2006 | Steinberg et al. |
| 2006/0044422 | A1 | 3/2006 | Miyazaki |
| 2007/0110427 | A1 * | 5/2007 | Tsai ........................ 396/166 |

FOREIGN PATENT DOCUMENTS

| | | |
|---|---|---|
| EP | 1 775 940 | 4/2007 |
| WO | WO 97/36427 | 10/1997 |

OTHER PUBLICATIONS

International Search Report for PCT/US2008/063048, filed Aug. 05, 2008.

* cited by examiner

*Primary Examiner*—Jason Chan
*Assistant Examiner*—Yih-Sien Kao (57) ABSTRACT

Methods and apparatuses for image exposure include capturing a first image under a first illumination condition, determining a luminance of the first image at a plurality of sectors, capturing a second image under a second illumination condition employing an artificial light source, determining a luminance of the second image at the plurality of sectors, and determining if the artificial light source should be used to capture a final image using the luminances of the first and second images at the plurality of sectors. If the artificial light source is to be used, an output level of the light source is determined.

5 Claims, 6 Drawing Sheets

METHODS AND APPARATUSES FOR IMAGE EXPOSURE CORRECTION

FIELD OF THE INVENTION

Embodiments of the invention relate generally to image exposure correction.

BACKGROUND OF THE INVENTION

In image capture, if a scene, or a part of the scene, is underexposed, the underexposed portion will appear dark, or even black, in the captured image. Under such conditions, details of the underexposed portion may be undistinguishable, and colors likewise distorted. Using an artificial light source (a source of light other than natural light), such as a flash, has long been known to illuminate a scene in order to increase the exposure of the scene when an image is captured with a camera.

A foreground object in a scene may be backlit, such as by sun or another light source behind the object. Using an artificial light source like a flash to increase the illumination of the foreground object is known as "fill flash," and increases the exposure of the foreground object to reduce underexposure effects. When photographing people and/or other subjects in bright sun, shadow areas in the image can be so dark that they show little or no detail. If the shadow covers a large part of the subject, the effect can be distracting and unattractive. The camera user can lighten the shadow area(s) by using the flash to "fill" the shadows (i.e., fill flash). In this mode, the flash fires even though there is enough available light to take the picture. However, conventional fill flash methods may provide too much light to background objects that are not covered by the shadowed area(s), causing them to become overexposed. Overexposed portions of a captured image appear light, or even white, and details and colors of the overexposed portions may be lost.

Accordingly, there is a need and desire to provide a method and apparatus for illuminating a scene to increase exposure of underexposed backlit foreground objects while decreasing the possibility of overexposure of background objects.

BRIEF DESCRIPTION OF THE DRAWINGS

FIG. 3 includes FIGS. 3A and 3B, and is a flowchart of a method of illuminating a scene in accordance with an embodiment described herein.

DETAILED DESCRIPTION OF THE INVENTION

In the following detailed description, reference is made to the accompanying drawings, which form a part hereof and show by way of illustration specific embodiments in which embodiments of the invention may be practiced. These embodiments are described in sufficient detail to enable those skilled in the art to practice them, and it is to be understood that other embodiments may be utilized, and that structural, logical, processing, and electrical changes may be made. The progression of processing steps described is an example; however, the sequence of steps is not limited to that set forth herein and may be changed as is known in the art, with the exception of steps necessarily occurring in a certain order.

Figure 1:
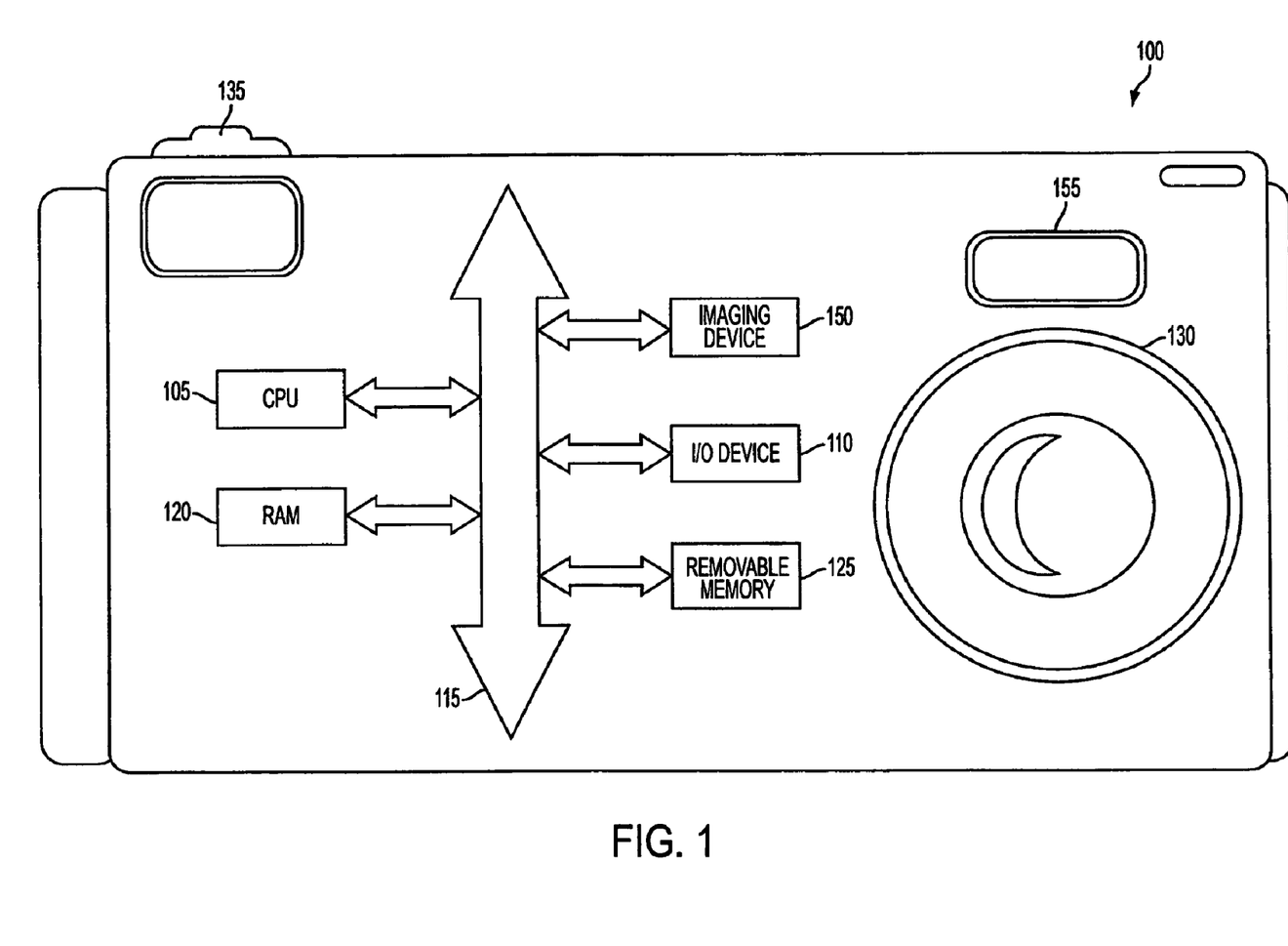
FIG. 1 is a camera system constructed in accordance with an embodiment described herein.

Now referring to the figures, where like numerals designate like elements, FIG. 1 is an embodiment of a camera system 100 having an imaging device 150 and implementing a method of illuminating a backlit foreground object according to an embodiment described herein. Camera system 100, for example, a still or video camera system, which generally comprises imaging device 150, a lens 130 for focusing an image on a pixel array of the imaging device 150 when shutter release button 135 is depressed, a central processing unit (CPU) 105, such as a microprocessor for controlling camera operations, that communicates with one or more input/output (I/O) devices 110 over a bus system 115. Imaging device 150 also communicates with the CPU 105 over bus system 115. The system 100 also includes random access memory (RAM) 120, and can include removable memory 125, such as flash memory, which also communicate with CPU 105 over the bus system 115. Imaging device 150, which has an image processor for image processing, may also be combined with a camera control processor, such as CPU 105, digital signal processor, or microprocessor, with or without memory storage on a single integrated circuit or on a different chip than the camera control processor. Camera system 100 may also include a light output device, such as flash 155. The CPU 105 may function as a control circuit to control the flash 155. It should be noted that embodiments may use a light output device that is not integrated into a camera, such as an external flash, a slave flash device, or a stand-alone flash controlled by CPU 105, as is known in the art.

Figure 2A:
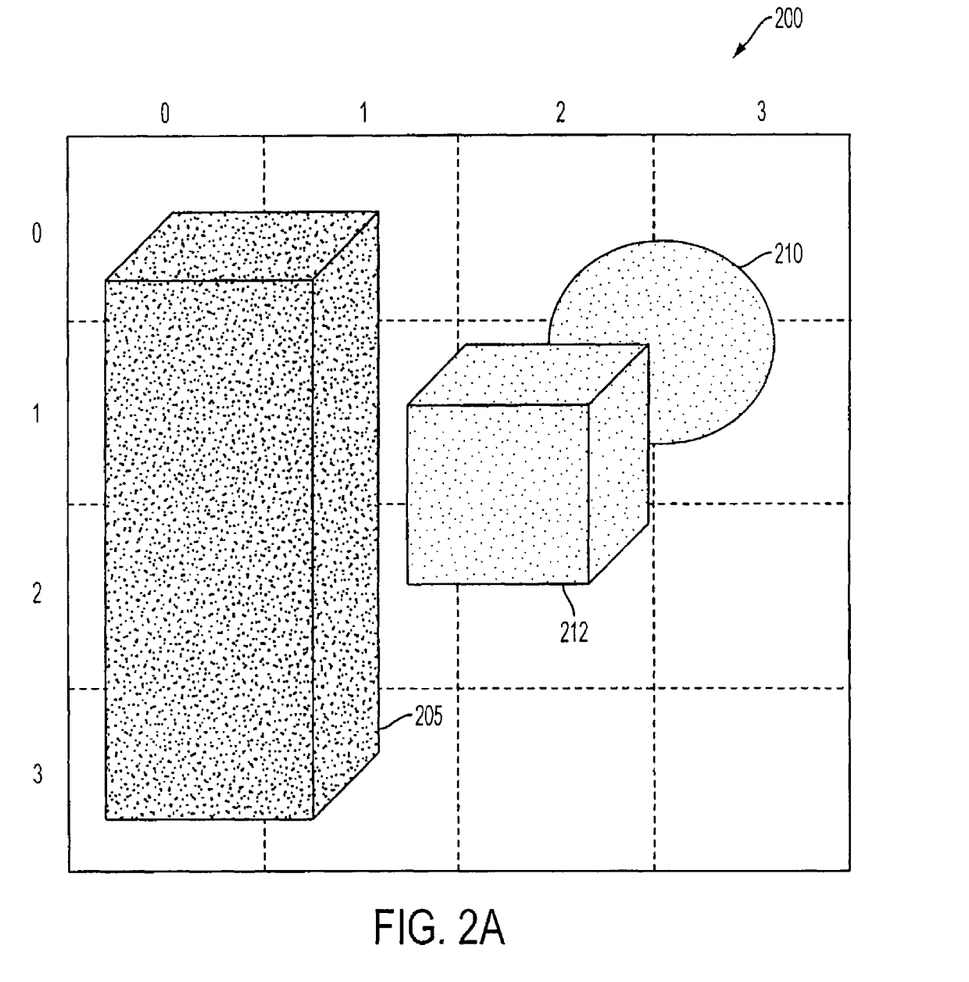
FIGS. 2A-2C are diagrams of successive illuminations of a scene having a backlit foreground object illuminated in accordance with an embodiment described herein.
Figure 2B:
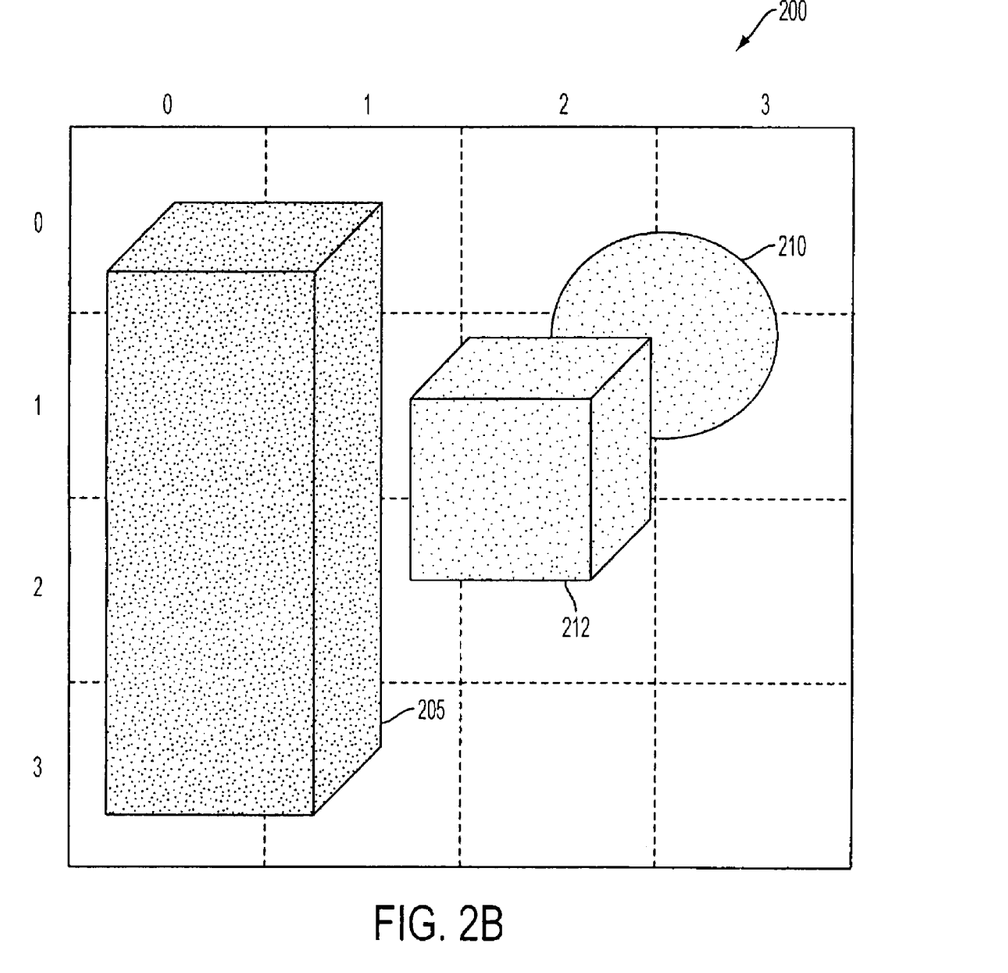
Figure 2C:
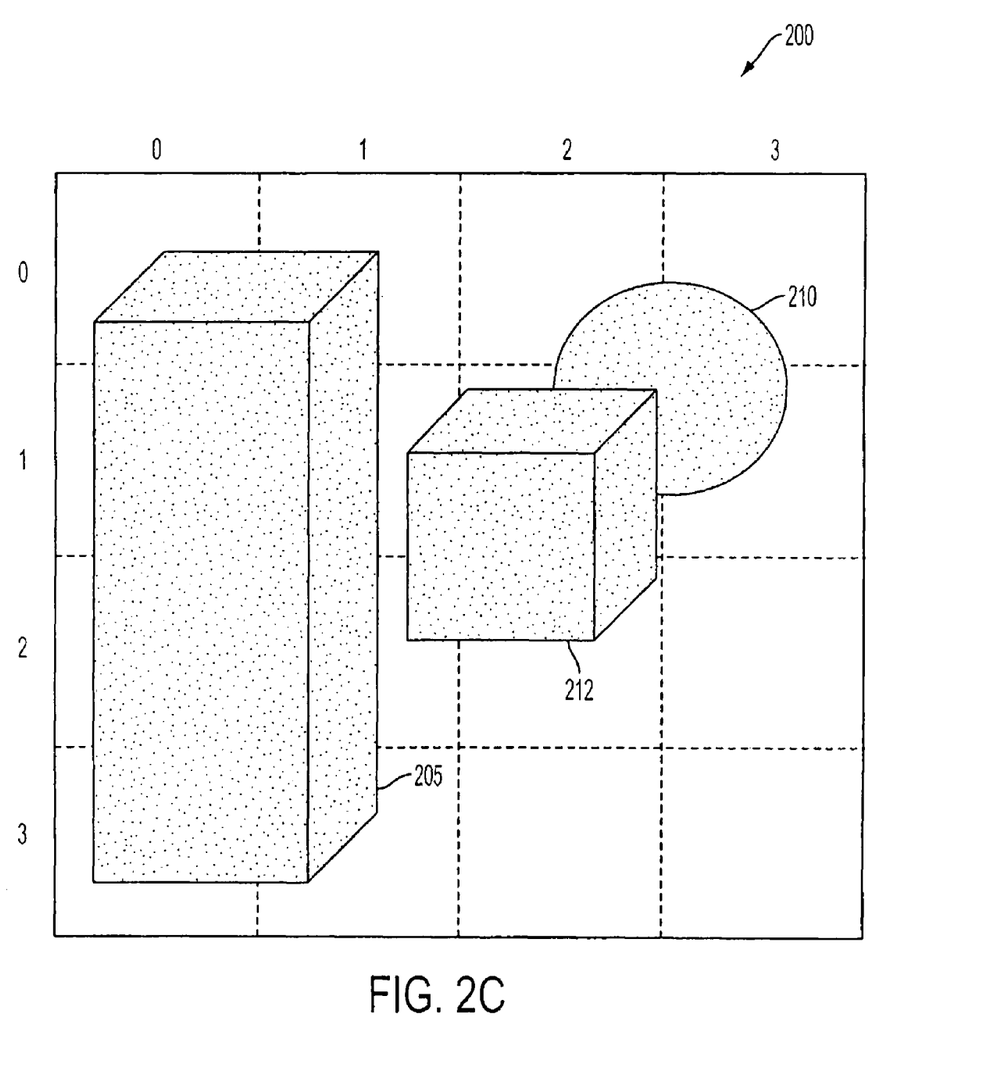
Figure 3A:
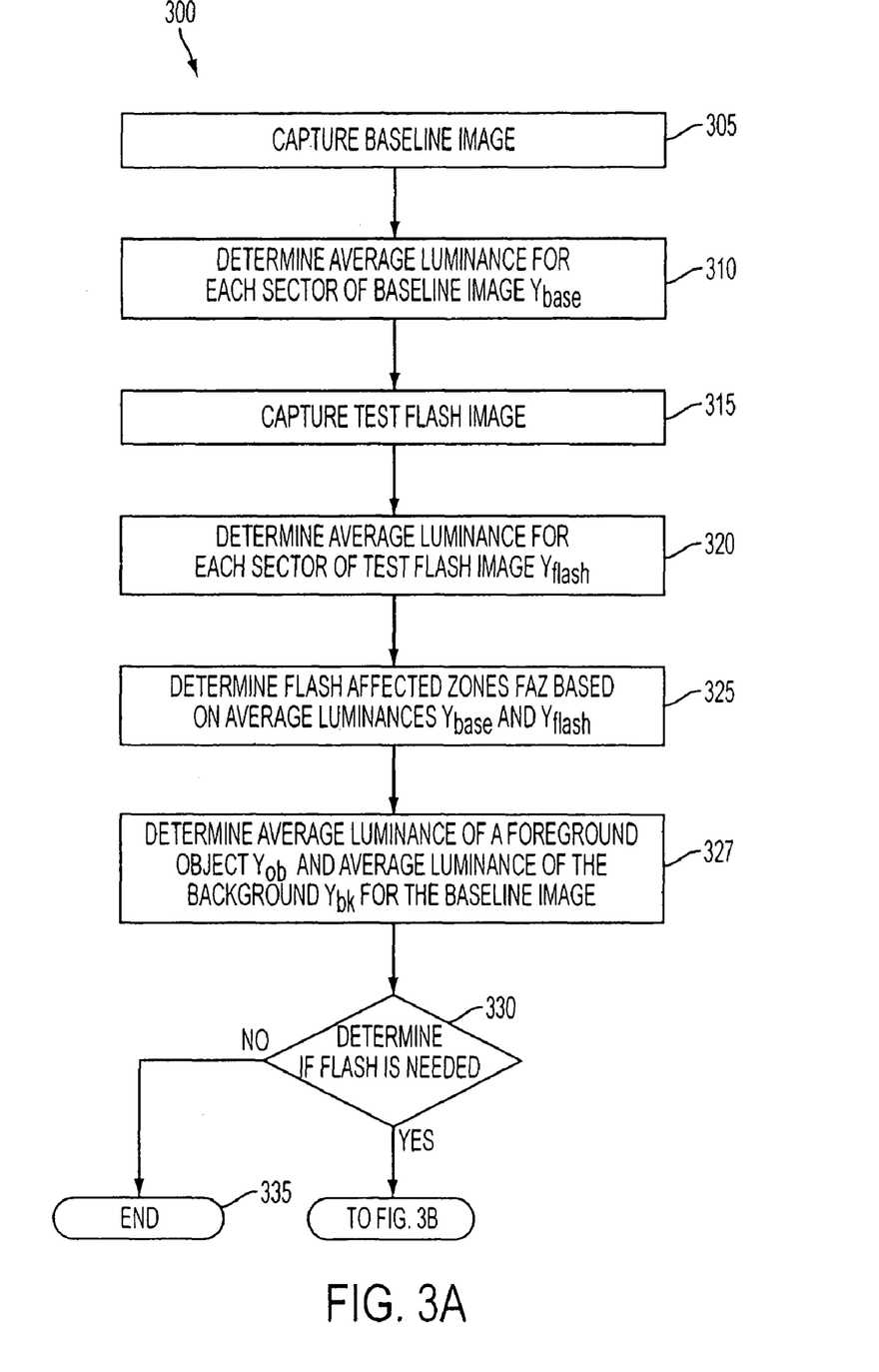
Figure 3B:
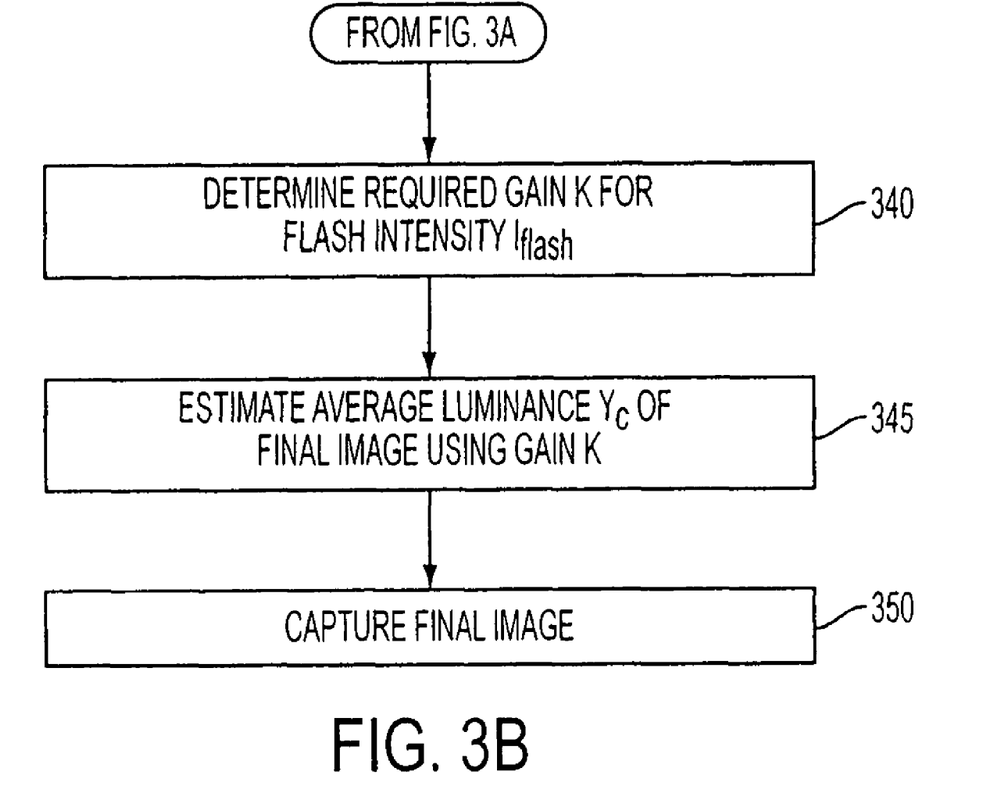

A method 300 of illuminating a backlit foreground object 205 while reducing the possibility of oversaturating background objects is now described with reference to FIGS. 2A, 2B, 2C, 3A, and 3B, where FIGS. 2A-2C are diagrams of successive illuminations of a scene 200 having a backlit foreground object 205 illuminated by flash 155 in accordance with an embodiment described herein. FIGS. 3A and 3B are a flowchart of the method 300.

Embodiments detect a backlit foreground object 205 and determine whether to increase its average luminance and, if so, by how much, using flash illumination provided by flash 155. A previewed image is precaptured with two image frames: a baseline image with no flash illumination, and a test flashlit image using a test flash illumination. Based on luminance (or brightness) values of the two image frames, a determination is made as to whether the illumination and exposure of the backlit foreground object 205 can be improved, and, if so, by how much, using flash illumination in a final image. The method 300 can further be used to calculate internal image output settings to adjust the overall scene 200 exposure to reach a target average luminance value for the final image.

Referring to FIGS. 3A and 3B, first, at step 305, a baseline image for the scene 200 is captured without using a flash to illuminate the scene 200. FIG. 2A shows scene 200 at the baseline non-flash illumination, and illustrates the foreground object 205 and two background objects 210, 212. Foreground object 205 appears dark because it is backlit (e.g., in a shadow). Background objects 210, 212 appear light because they are brightly lit by the backlight (e.g., the sun). The imaged scene 200 is divided in the camera system 100 into sectors (0,0) through (N,N). In the illustrated example, sixteen sectors are used, and N is set to three. The sixteen sectors are identified in FIGS. 2A-2C by the dotted lines. The number of sectors may be preprogrammed, with more sectors allowing for a finer-tuning by the method 300, as explained below. It should be noted that the sectors may also be divided into rectangular or other non-square shapes, based on, for example, the geometry of an image sensor, the lens 130, the viewing angle (e.g., panoramic), etc. The sectors represent portions of an image captured by the pixel array of imaging device 150.

At step 310, an average luminance for each of the sixteen sectors is determined as a baseline luminance matrix $Y_{base}$. In the illustrated non-limiting example, a baseline luminance matrix $Y_{base}$ may be expressed as:

$$Y_{base} = \begin{bmatrix} 3 & 66 & 122 & 121 \\ 3 & 52 & 70 & 82 \\ 3 & 48 & 62 & 98 \\ 3 & 52 & 94 & 75 \end{bmatrix} \quad (1)$$

where each number in the baseline luminance matrix $Y_{base}$ represents the average luminance of one of the sixteen sectors $Y_{base}$[sector] for each sector (0,0) through (3,3). It should be noted that, although the term "luminance" is primarily used herein, the term "brightness" may be used interchangeably to refer to the same characteristic.

Next, at step 315, a test flash illumination is provided by flash 155 at a predetermined partial power level of the maximum flash power of flash 155 allowing the imaging device 150 to capture a test flashlit image of the scene 200. In this example, ¼ of the maximum flash power is used. FIG. 2B shows that the foreground object 205 is brighter than it was in FIG. 2A, although not as bright as the background objects 210, 212. It is possible that the test flash illumination can increase the brightness of the foreground object 205 to be brighter than the background objects 210, 212, and/or to increase the brightness of the background objects 210, 212. The average luminance for each of the sixteen sectors for sectors (0,0) through (3,3) of the test flashlit image is determined as a flash luminance matrix $Y_{flash}$ at step 320. In the illustrated example, a test flash luminance matrix $Y_{flash}$ may be expressed as:

$$Y_{flash} = \begin{bmatrix} 15 & 69 & 120 & 119 \\ 27 & 62 & 68 & 80 \\ 41 & 57 & 61 & 96 \\ 20 & 56 & 92 & 74 \end{bmatrix} \quad (2)$$

where each number in the test flash luminance matrix $Y_{flash}$ represents the average luminance of one of the sixteen sectors $Y_{flash}$[sector] while the scene 200 is illuminated by the test flash at the predetermined partial flash power.

Flash affected zones (FAZ) are then determined at step 325. Flash affected zones are sectors for which the average brightness was changed by the test flash by more than a predetermined threshold when compared to the baseline image. The threshold value may be programmed during manufacturing, or selected according to lighting conditions, for example, based on the average luminance of the test flash luminance matrix $Y_{flash}$. In the illustrated example, the threshold is a 5% difference, such that the flash affected zone matrix FAZ becomes:

$$FAZ = \begin{bmatrix} 1 & 0 & 0 & 0 \\ 1 & 1 & 0 & 0 \\ 1 & 1 & 0 & 0 \\ 1 & 1 & 0 & 0 \end{bmatrix} \quad (3)$$

where sectors (0,0) through (3,3) having a luminance value change of more than 5% are designated as "1," and sectors for which the luminance change was less than 5% are designated as "0."

The average luminance of a foreground object $Y_{ob}$ and average luminance of the background $Y_{bk}$ for the baseline image are determined by averaging the luminances of corresponding sectors (step 327) according to the following equations:

$$Y_{ob} = \Sigma(Y_{base\_i} * FAZ_i) / \Sigma(FAZ_i); \quad (4)$$

$$Y_{bk} = \Sigma(Y_{base\_i} * (1 - FAZ_i)) / \Sigma(1 - FAZ_i); \quad (5)$$

where $Y_{ob}$ is the average luminance of the foreground object 205, $Y_{bk}$ is the average luminance of the background, i is a flash affected zone index corresponding to a sector of the image, $Y_{base\_i}$ is a baseline luminance matrix for each flash affected zone sector, and $FAZ_i$ is each sector for which FAZ=1. In this example, $Y_{ob}$=23 LSB, and $Y_{bk}$=88 LSB, where luminance is an 8-bit value in least significant bits (LSB) of a higher bit number (e.g., 10 bits) of the captured image pixel data, having decimal levels from 0 to 255.

Thus, the sectors containing a backlit foreground object 205 may be distinguished from the sectors containing only background objects 210, 212. The total number of sectors may be selected to achieve a more fine-grained allocation of foreground and background sectors, i.e., more sectors would yield smaller sector sizes and correspondingly finer granularity in the image and in defining the shape of the backlit foreground object 205. In FIG. 2B, the foreground sectors are determined to be {(0,0), (0,1), (1,1), (0,2), (1,2), (0,3), (1,3)}, and the background sectors are the remaining nine sectors. It should be noted that, as in the illustrated example, the background objects 210, 212 may be in only some of the background sectors.

It is then determined at step 330 whether the illumination and exposure of the backlit foreground object 205 can be improved by using a flash illumination. The determination may be made based on whether the average luminance for the foreground object $Y_{ob}$ of the flash affected zones is below the average luminance for the background $Y_{bk}$ of the non-flash affected zones by at least a threshold T (which may be predetermined, i.e., programmable). The following condition would be satisfied:

$$Y_{ob} \leq Y_{bk} - T \quad (6)$$

where $Y_{ob}$ is the average luminance of the backlit foreground object 205, T is the predetermined threshold, and $Y_{bk}$ is the average luminance of the background. If the result of step 330 is "No," then the method 300 ends (step 335). If the result of step 330 is "Yes," then the method 300 continues to step 335 (FIG. 3B) because a flash illumination is required.

At step 340, the method 300 must determine a gain K by which a test flash intensity $I_{flash}$ (described below) will be multiplied to obtain a calibrated flash value. Prior to making this calculation, the following principles must be considered. For the baseline image, the average brightness is proportional to the intensity of ambient light $I_{ambient}$; for the test flashlit image, the average brightness is proportional to the intensity of ambient light $I_{ambient}$ combined with the test flash intensity $I_{flash}$ (i.e., a power level of the flash illumination provided by flash 155). Therefore:

$$Y_{flash}/Y_{base}=1+I_{flash}/I_{ambient} \quad (7)$$

where $I_{flash}$ is the test flash intensity, and $I_{ambient}$ is the intensity of ambient light, and $Y_{base}$ and $Y_{flash}$ are as defined above in expressions (1) and (2).

As described above, K is the gain by which the test flash intensity $I_{flash}$ is to be multiplied to obtain the appropriate calibrated flash intensity $I_c$ to generate an image of the scene 200 where the backlit foreground object 205 is not underexposed, and the background objects 210, 212 are not overexposed. $K_{bk}$ is the flash intensity gain needed to raise the backlit foreground object 205 average luminance $Y_{ob}$ to the background object 210 average luminance $Y_{bk}$, $K_{max}$ is a gain needed to raise the test flash power (or intensity) to the maximum flash power (or intensity), and $K_{sat}$ is maximum flash intensity gain allowed such that no sector is oversaturated. K is equal to the minimum one of $K_{bk}$, $K_{max}$, and $K_{sat}$, that is:

$$K=\min(K_{bk},K_{max},K_{sat}) \quad (8)$$

Thus, the method 300 can estimate at step 340 how much the flash intensity $I_{flash}$ has to be changed by the gain K to increase the backlit foreground object 205 average luminance $Y_{ob}$ to approach the background brightness $Y_{bk}$:

$$I_c=K*I_{flash} \quad (9)$$

where $I_{flash}$ is the test flash intensity, K is a gain (according to equation (8)) of the change required for $I_{flash}$, and $I_c$ is the calculated changed flash intensity (or determined flash intensity).

Next, at step 345, an estimate of average luminance for an image taken with a flash power at the calculated changed flash intensity $I_c$ can be calculated according to:

$$Y_c=Y_{base}*(1+K*I_{flash}/I_{ambient}) \quad (10)$$

$$Y_c=Y_{base}+K*(Y_{flash}-Y_{base}) \quad (11)$$

where $Y_c$ is the calculated (or determined) estimate average luminance for an image taken with a flash power at calculated changed flash intensity $I_c$, and $I_{flash}$, $I_{ambient}$, K, $Y_{flash}$, and $Y_{base}$ are as defined above. Equation (11) is derived from equations (7) and (10). If the calculated estimate average luminance $Y_c$ is at an acceptable level, such as a target average luminance value or a predetermined maximum average luminance value, a final image may then be captured using a values (step 350).

As an example, $K_{bk}$ may be calculated using equation (5), where $Y_c$ from equation (11) is used in place of $Y_{base\_i}$. A standard iterative method may be used, where (a.) an initial value is set for $K_{bk}$ to calculate $Y_c$ using equation (11) for each flash affected zone, (b.) equation (5) is used to estimate a new $Y_{bk}$, and (c.) if the estimated $Y_{bk}$ differs from a predetermined target, adjust $K_{bk}$ on step (a.) and repeat steps (b) and (c).

In addition, $K_{sat}$ may be calculated according to:

$$K_i=(255-Y_{base\_i})/(Y_{flash\_i}-Y_{base\_i}) \quad (12)$$

$$K_{sat}=\min(K_i) \quad (13)$$

where $K_i$ is a gain for each flash affected zone sector, $Y_{base\_i}$ is a baseline luminance matrix for each flash affected zone sector, and $Y_{flash\_i}$ is a test flash luminance matrix for each flash affected zone sector.

Thus, it is possible to estimate a new luminance $Y_c$[sector] of each sector (0,0) through (3,3) when the flash intensity $I_{flash}$ is multiplied by K, and the final image is captured using the calculated changed flash intensity $I_c$. For example, if K=3.5, then $Y_{ob}$=80 LSB and $Y_{bk}$=88 LSB. Therefore, if a new final image is captured using the calibrated flash illumination that is 3.5 times brighter than the test flash illumination, the calculated average final scene luminance $Y_c$ is about 85 LSB. If a target for average luminance of the final image is 60 LSB, and the calculated average final scene luminance $Y_c$ is about 85 LSB, the final image may be captured using flash 155 set to a power level at the calculated changed flash intensity $I_c$, and the internal image output settings may be adjusted to decrease the overall scene 200 exposure by 85/60 times to reach the target average luminance.

The processes and devices in the above description and drawings illustrate examples of methods and devices of many that could be used and produced to achieve the objects, features, and advantages of embodiments described herein. For example, embodiments include power supplied from a battery, wall outlet, transformer, or any variable or fixed voltage or current power supply. Camera system 100 is one example of a device which may implement the method 300. Camera systems using film may also be used, as long as sufficient internal processing ability and appropriate light sensors are provided to perform the method 300 before film exposure. The method 300 may be performed while the shutter release button 135 is partially depressed, as during known auto-focus methods, or at any time before a final image is captured. It should also be noted that additional test flash illuminations may be used, and additional test images captured, for additional adjustment of the calibrated flash intensity to obtain the final image.

In addition, CPU 105 may perform the method 300. Alternatively, a controller within the imaging device 150 may perform the method 300. Examples of an imaging device 150 which may be used in camera system 100 are described in U.S. Pat. Nos. 6,140,630; 6,376,868; 6,310,366; 6,326,652; 6,204,524; and 6,333,205, which are incorporated herein by reference. These patents describe a CMOS imaging device 150, but other solid state imaging devices may be employed, including CCD imaging devices and others. Moreover, the method 300 may be implemented in software, and embodiments include a storage medium containing a program executed by a processor for implementing the method 300.

The camera system 100 is one example of a system having digital circuits that could include image sensor devices. Without being limiting, such a system could instead include a computer system, video phone, surveillance system, auto focus system, motion detection system, and other image acquisition and processing systems.

Thus, the embodiments are not to be seen as limited by the foregoing description of the embodiments, but only limited by the appended claims.

What is claimed as new and desired to be protected by Letters Patent of the United States is:

1. A method of correcting image exposure carried out by an imaging system comprising a processor, the method comprising:
    capturing a first image of a scene;
    using the processor for:
        determining a plurality of luminance values for the first image;
        determining a first respective average luminance for each of a first plurality of image sectors within the first image; and providing a first flash illumination on the scene at a first intensity, the first flash intensity of the first flash illumination being a portion of a maximum flash intensity;

capturing a second image of the scene;

using the processor for:

determining a second respective average luminance for each of a second plurality of image sectors of the second image, each of the second plurality of image sectors corresponding to one of the first plurality of image sectors;

determining, based on the first and second average luminances, at least one flash affected sector and at least one non-flash affected sector;

determining an average luminance of each flash affected sector and each non-flash affected sector;

determining for the first image whether an average luminance of a foreground object exceeds an average luminance of a background by a threshold value; and determining a gain by which the first flash intensity is to be multiplied to obtain a second flash intensity; and capturing a third image of the scene while providing a second flash illumination to the scene, wherein the second flash intensity of the second flash illumination is based on the determination of the average luminance of each of the flash affected sectors and the non-flash affected sectors, wherein an average luminance of a foreground object $Y_{ob}$ and average luminance of a background $Y_{bk}$ for the first image are determined by averaging selected sectors of the first respective average luminance for each of the first plurality of image sectors within the first image according to:

$$Y_{ob} = \Sigma(Y_{base\_i} * FAZ_i)/\Sigma(FAZ_i); \text{ and}$$

$$Y_{bk} = \Sigma(Y_{base\_i} * (1-FAZ_i))/\Sigma(1-FAZ_i),$$

where $Y_{ob}$ is the average luminance of a foreground object, $Y_{bk}$ is the average luminance of the background, i is a flash affected zone index, $Y_{base\_i}$ is a baseline luminance matrix for each flash affected zone sector, and $FAZ_i$ is each flash affected zone sector, wherein the determination of whether the average luminance of a foreground object exceeds the average luminance of the background by a threshold value is made according to:

$$Y_{ob} \leq Y_{bk} - T,$$

where $Y_{ob}$ is the average luminance of the foreground object, T is a predetermined threshold value, and $Y_{bk}$ is the average luminance of the background, and wherein the gain by which the first flash intensity is to be multiplied to obtain the second flash intensity is determined according to:

$$K = \min(K_{bk}, K_{max}, K_{sat}),$$

where $K_{bk}$ is the flash intensity gain needed to raise the foreground object's average luminance $Y_{ob}$ to the background average luminance $Y_{bk}$, $K_{max}$ is a gain needed to raise the first flash intensity to the maximum flash intensity, and $K_{sat}$ is a maximum flash intensity gain allowed such that no sector is oversaturated.

2. The method of claim 1, further comprising determining the second flash intensity based on how much the first flash intensity has to be changed by the gain to increase the average foreground object luminance up to background average luminance according to:

$$I_c = K * I_{flash},$$

where $I_{flash}$ is the first flash intensity, K is the determined gain of the change required for $I_{flash}$, and $I_c$ is the second flash intensity.

3. The method of claim 2, further comprising determining an estimated average luminance for the third image according to:

$$Y_{flash}/Y_{base} = 1 + I_{flash}/I_{ambient};$$

$$Y_c = Y_{base} * (1 + K * I_{flash}/I_{ambient}); \text{ and}$$

$$Y_c = Y_{base} + K * (Y_{flash} - Y_{base}),$$

where $Y_c$ is a determined estimate average luminance for the third image with the second flash power using the second flash intensity $I_c$, $I_{flash}$ is the first flash intensity, $I_{ambient}$ is an intensity of ambient light, K is the determined gain of the change required for $I_{flash}$, $Y_{base}$ is a baseline luminance matrix comprising the first respective average luminances for each of the first plurality of image sectors of the first image, and $Y_{flash}$ is a test flash luminance matrix comprising the second respective average luminances for each of the second plurality of image sectors of the second image.

4. The method of claim 1, further comprising determining the maximum flash intensity gain allowed such that no sector is oversaturated $K_{sat}$ according to:

$$K_i = (255 - Y_{base\_i})/(Y_{flash\_i} - Y_{base\_i}); \text{ and}$$

$$K_{sat} = \min(K_i),$$

where $K_i$ is a gain for each flash affected zone sector, $Y_{base\_i}$ is a baseline luminance matrix for each flash affected zone sector, and $Y_{flash\_i}$ is a test flash luminance matrix for each flash affected zone sector.

5. The method of claim 3, further comprising determining the flash intensity gain needed to raise the backlit foreground object average luminance to the background object average luminance $K_{bk}$ based on the average luminance of the background for the first image $Y_{bk}$ and the estimated average luminance for the third image $Y_c$.

* * * * *